US011212405B2

United States Patent
Odani (10) Patent No.: US 11,212,405 B2
(45) Date of Patent: *Dec. 28, 2021

(54) IMAGE READING APPARATUS THAT STARTS SCANNING BASED ON DETECTION OF ORIGINAL AND CONTROL METHOD THEREOF

(71) Applicant: TOSHIBA TEC KABUSHIKI KAISHA, Tokyo (JP)

(72) Inventor: Makoto Odani, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,749

(22) Filed: Sep. 28, 2020

(65) Prior Publication Data

US 2021/0084179 A1 Mar. 18, 2021

Related U.S. Application Data

(63) Continuation of application No. 16/568,967, filed on Sep. 12, 2019, now Pat. No. 10,827,087.

(51) Int. Cl.
*G06F 15/00* (2006.01)
*G06F 3/12* (2006.01)
(Continued)

(52) U.S. Cl.
CPC ..... *H04N 1/00702* (2013.01); *H04N 1/00395* (2013.01); *H04N 1/00411* (2013.01);
(Continued)

(58) Field of Classification Search
CPC .......... H04N 1/00702; H04N 1/00395; H04N 1/00411; H04N 1/00517; H04N 1/00551;
(Continued)

(56) References Cited

U.S. PATENT DOCUMENTS 7,173,721 B1    2/2007  Kobayashi et al.
7,911,641 B2 *  3/2011  Akimoto ............ H04N 1/00082
                                                        358/1.6
(Continued)

FOREIGN PATENT DOCUMENTS

EP          2961149 A1     12/2015

OTHER PUBLICATIONS

Extended European Search Report dated Dec. 7, 2020, mailed in counterpart European Patent Application No. 20184838.9, 9 pages.

*Primary Examiner* — Douglas Q Tran
(74) *Attorney, Agent, or Firm* — Kim & Stewart LLP (57) ABSTRACT

An image reading apparatus includes a scanner, a sensor, and a controller. The sensor is configured to detect an original at a predetermined position. The controller is configured to determine whether or not an immediate execution mode in which no user operation is needed to cause the scanner to start scanning is set, and in case the immediate execution mode is determined to be set, determine whether or not a scan start condition is satisfied. The scan start condition includes the sensor detecting the original at the predetermined position. The controller is configured to control the scanner to start scanning, upon a standby time of a predetermined amount being passed since the scan start condition is satisfied.

18 Claims, 5 Drawing Sheets

(51) Int. Cl.
*G06K 1/00* (2006.01)
*H04N 1/00* (2006.01)
*H04W 8/20* (2009.01)

(52) U.S. Cl.
CPC ..... *H04N 1/00517* (2013.01); *H04N 1/00551* (2013.01); *H04N 1/00779* (2013.01); *H04N 1/00814* (2013.01); *H04N 1/00925* (2013.01); *H04W 8/205* (2013.01)

(58) Field of Classification Search
CPC ........... H04N 1/00779; H04N 1/00814; H04N 1/00925; H04W 8/205
USPC .............................. 358/1.13, 1.14, 1.15, 1.1
See application file for complete search history.

(56) References Cited

U.S. PATENT DOCUMENTS

| | | |
|---|---|---|
| 9,473,656 B2 | 10/2016 | Adachi |
| 2006/0103898 A1 | 5/2006 | Okawa |
| 2014/0021679 A1* | 1/2014 | Kato .................... B65H 3/0676 271/109 |
| 2015/0092220 A1 | 4/2015 | Matsunaga |
| 2015/0138597 A1 | 5/2015 | Koshigaya |
| 2016/0182754 A1 | 6/2016 | Kadobayashi |
| 2018/0007223 A1* | 1/2018 | Hamada ................ H04N 1/3878 |
| 2019/0135564 A1* | 5/2019 | Machida ................... B65H 1/04 |
| 2019/0222707 A1 | 7/2019 | Nojiri et al. |

\* cited by examiner

IMAGE READING APPARATUS THAT STARTS SCANNING BASED ON DETECTION OF ORIGINAL AND CONTROL METHOD THEREOF

CROSS-REFERENCE TO RELATED APPLICATIONS

This application is a continuation of U.S. patent application Ser. No. 16/568,967, filed on Sep. 12, 2019, the entire contents of each of which are incorporated herein by reference.

FIELD

Embodiments described herein relate generally to an image reading apparatus and a control method thereof.

BACKGROUND

In the related art, an image reading apparatus performs various processes by reading an image of a set sheet. For example, data of the read image may be recorded on a predetermined information processing apparatus or recording medium. In addition, the data of the read image may be faxed or may be copied in conjunction with an image forming apparatus.

An image of the sheet is read after a user sets the sheet at a predetermined location and then inputs an operation indicating reading execution. However, some users may have been seeking for higher job efficiency.

DETAILED DESCRIPTION

In general, according to an embodiment, an image reading apparatus includes a scanner, a sensor, and a controller. The sensor is configured to detect an original at a predetermined position. The controller is configured to determine whether or not an immediate execution mode in which no user operation is needed to cause the scanner to start scanning is set, and in case the immediate execution mode is determined to be set, determine whether or not a scan start condition is satisfied. The scan start condition includes the sensor detecting the original at the predetermined position. The controller is configured to control the scanner to start scanning, upon a standby time of a predetermined amount being passed since the scan start condition is satisfied.

Figure 1:
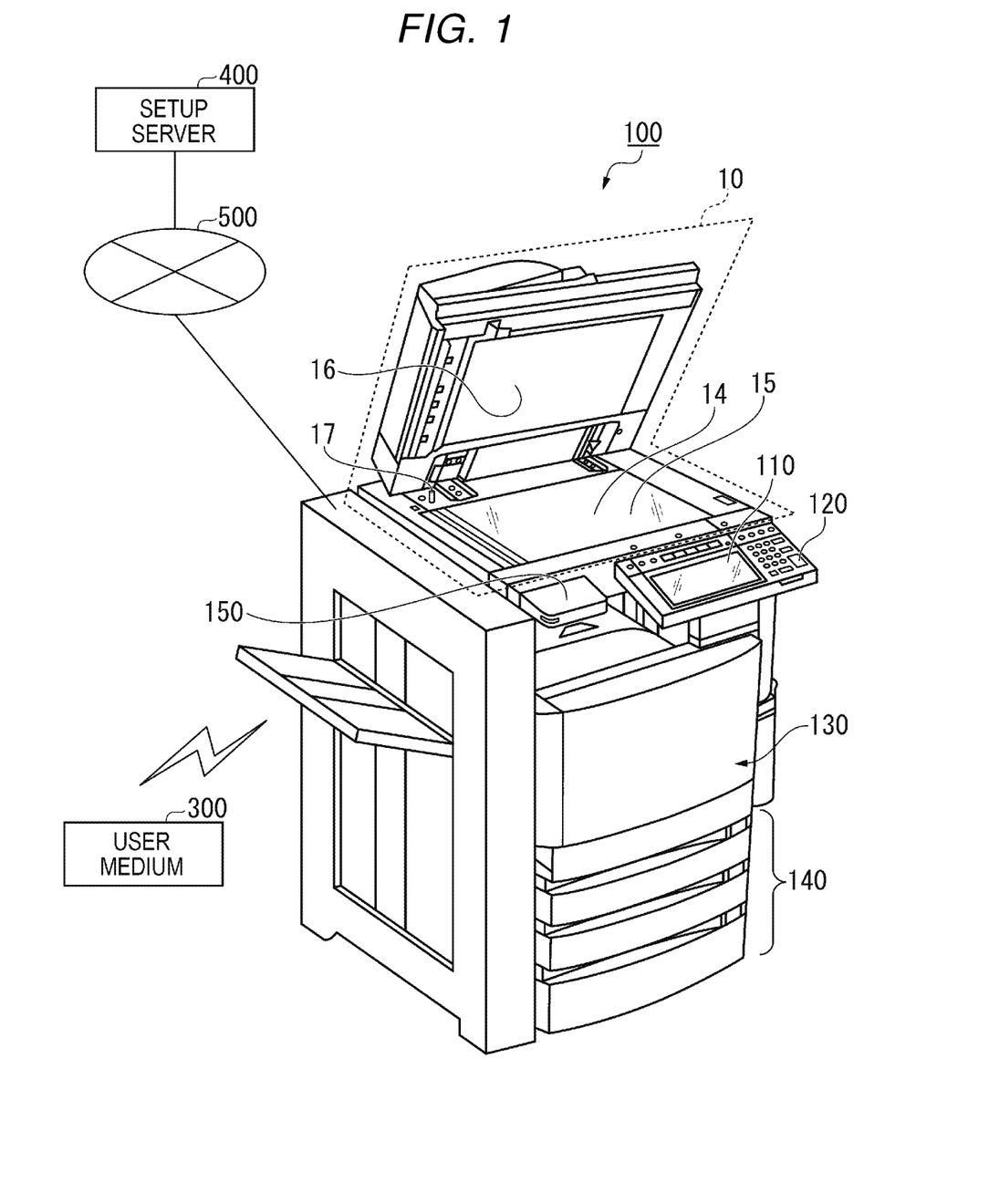
FIG. 1 illustrates a configuration example of an image forming system according to an embodiment.

FIG. 1 illustrates a configuration example of an image forming system 900 according to an embodiment. The image forming system 900 includes an image forming apparatus 100, a user medium 300, and a setup server 400. The image forming apparatus 100 is an apparatus for forming an image on a sheet. The image forming apparatus 100 is, for example, a multi-function peripheral (MFP). The image forming apparatus 100 includes an image reading unit 10 to perform a process, such as faxing, coping, or the like, by using the image read from the sheet.

The user medium 300 is a device carried by a user. The user medium 300 is a device portable at least by the user, and stores a user ID. The user medium 300 may be an information processing apparatus capable of wireless communication, for example, a smart phone, a mobile phone, or the like. The applied wireless communication may be, for example, Bluetooth®. The user medium 300 may be a signal transmitter that transmits a wireless signal. The user medium 300 may be a medium including radio frequency identification (RFID) tag. Specific examples of the medium including the RFID tag include a watch, a ring, a card, an information processing apparatus, and the like. The user medium 300 may be a magnetic card. The image forming apparatus 100 includes a device obtaining the user ID from the user medium 300.

The setup server 400 stores setup information related to an operation of the image forming apparatus 100 in association with the user ID. The setup server 400 receives setup request information including the user ID from the image forming apparatus 100. The setup server 400 transmits the setup information corresponding to the user ID included in the setup request information to the image forming apparatus 100. The number of pieces of setup information stored in the setup server 400 in association with one user ID is one or more.

Next, the image forming apparatus 100 will be described. The image forming apparatus 100 includes the image reading unit 10, a display 110, a control panel 120, an image forming unit 130, a sheet accommodating unit 140, and a data obtaining device 150. The image forming apparatus 100 forms an image on a sheet by using a developing agent, such as toner or the like. The sheet is, for example, a piece of paper or a label. The sheet may be any sheet as long as the image forming apparatus 100 is capable of forming an image on a surface thereof.

The image reading unit 10 generates image data by reading an image based on light and shade of light. The image reading unit 10 outputs the generated image data to a control unit of the image forming apparatus 100. The generated image data may be transmitted to another information processing apparatus through a network. The generated image data may be transmitted to another facsimile machine through a communication network by a faxing function. The generated image data may be imaged on the sheet by the image forming unit 130.

The display 110 is an image display apparatus, such as a liquid crystal display, an organic electro luminescence (EL) display, or the like. The display 110 displays various types of information related to the image forming apparatus 100.

The control panel 120 includes a plurality of buttons. The control panel 120 receives an operation of the user. The display 110 and the control panel 120 may be configured as an integrated touch panel.

The image forming unit 130 prints the image on the sheet based on image data generated by the image reading unit 10 or image data received through the network. The sheet where the image is printed may be a sheet accommodated in the sheet accommodating unit 140 or a sheet pointed by hand.

The sheet accommodating unit 140 accommodates sheets used by the image forming unit 130 to form an image.

The data obtaining device 150 obtains the user ID from the user medium 300. The data obtaining device 150 may be an example of a wireless communication interface. A device applied to the data obtaining device 150 is a device corresponding to a type of the user medium 300. For example, when the user medium 300 is a communication device performing wireless communication of a protocol such as Bluetooth®, the data obtaining device 150 is configured as a device receiving wireless communication of the protocol. For example, when the user medium 300 is a signal transmitter, the data obtaining device 150 is configured as a device receiving a signal. For example, when the user medium 300 is a medium including an RFID tag, the data obtaining device 150 is configured by using an RFID reader. The data obtaining device 150 is not limited to the above examples described above. The data obtaining device 150 may be any device capable of obtaining the user ID, and for example, may be configured as a sensor capable of face authentication, or the like. When the data obtaining device 150 is configured by using a sensor capable of face authentication, the data obtaining device 150 may include a table in which face information and a user ID are mapped to each other. For example, the data obtaining device 150 may obtain the user ID by following operations. First, the data obtaining device 150 captures an image of a face of the user by controlling an imaging device provided in the sensor. The image obtaining device 150 obtains face information in a predetermined format by obtaining feature values from the image of the face obtained via the capturing. Then, the data obtaining device 150 obtains the user ID registered in the table in association with the obtained face information.

Figure 2:
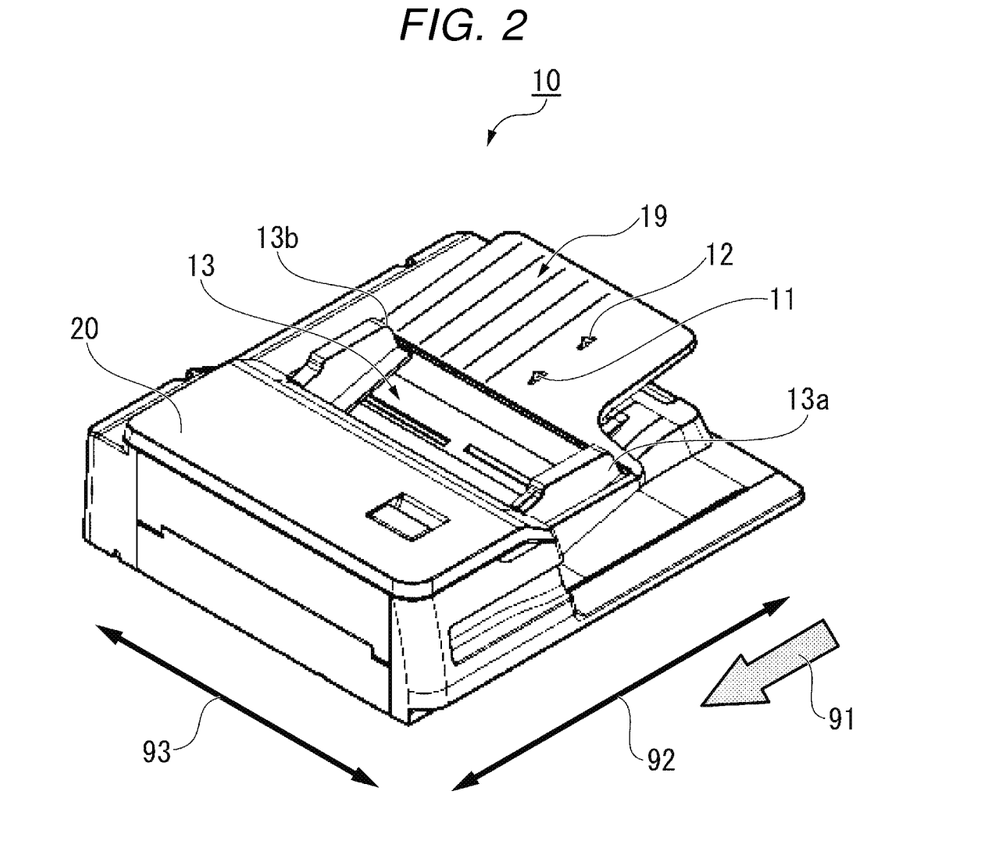
FIG. 2 illustrates an exterior view of an image reading unit.

FIG. 2 illustrates an exterior view of the image reading unit 10 according to an embodiment. The image reading unit 10 may be configured as an automatic document feeder (ADF). The image reading unit 10 includes a tray 19 and a first scanner 20. In FIG. 2, the image reading unit 10 is configured as an automatic document feeder. The image reading unit 10 conveys a sheet placed on the tray 19 in a sheet conveying direction indicated by an arrow 91. The tray 19 includes a first sensor 11, a second sensor 12, and a width sensor 13. When the sheet is placed on the tray 19, the first sensor 11 and the second sensor 12 detect the placed sheet. It may be determined whether the sheet is placed on the tray 19 by operations of the first sensor 11 and the second sensor 12. Also, a sheet length in a length direction indicated by an arrow 92 may be detected by the operations of the first sensor 11 and the second sensor 12. The width sensor 13 detects a sheet width in a width direction indicated by an arrow 93 with respect to the sheet placed on the tray 19. The sheet width indicates a length of the sheet from one end to the other end in the width direction.

The first sensor 11 and the second sensor 12 may be configured by using any sensor capable of detecting the placed sheet. In the example of FIG. 2, the first sensor 11 and the second sensor 12 are each configured by using a convex body biased upward of the tray 19. The convex body protrudes from a sheet placement surface of the tray 19 when the sheet is not placed on the tray 19. When the sheet is placed, the weight of sheet exerts downward force to the convex body. Accordingly, the convex body moves downward. The movement of convex body is detected by a sensor such as an optical sensor, and thus presence of the sheet is detected.

The width sensor 13 may be configured by using any sensor capable of detecting the sheet width of the sheet. In the example of FIG. 2, the width sensor 13 is configured by using movable walls 13*a* and 13*b* capable of moving in the width direction. Locations of the movable walls 13*a* and 13*b* are detected by a sensor such as an optical sensor or the like. A length between the movable walls 13*a* and 13*b* in the width direction is detected as the sheet width. Any one of the movable walls 13*a* and 13*b* may be configured as a fixed wall that does not move.

The first scanner 20 generates image data by reading the image on the sheet placed and conveyed on the tray 19. The first scanner 20 outputs the generated image data to the control unit of the image forming apparatus 100.

The image reading unit 10 will be continuously described with reference to FIG. 1. The image reading unit 10 includes a document table 14, a second scanner 15, a cover 16, and a cover sensor 17. The document table 14 includes a transparent flat surface such as glass or the like. An original is placed on the document table 14. The second scanner 15 is provided below the document table 14. The second scanner 15 generates image data by reading an image of the original placed on the document table 14. The second scanner 15 outputs the generated image data to the control unit of the image forming apparatus 100. The second scanner 15 also operates as a sensor (document table sensor) configured to detect that a sheet such as an original or the like is placed on the document table 14. For example, the second scanner 15 may determine whether or not the original is placed on the document table 14 by irradiating the document table 14 at predetermined timing with light and receiving reflected light. In particular, when a color other than a surface (for example, white) of the cover 16 is detected from the received light, it may be determined that the sheet is placed.

The cover 16 is a cover that covers the surface of the document table 14 and is provided to be opened or closed. When the cover 16 is opened, the surface of the document table 14 is not covered by the cover 16. In this case, the user may place the original on the document table 14 or pick up the placed original. When the cover 16 is closed, the surface of the document table 14 is covered by the cover 16. In this case, the user is unable to place the original on the document table 14 or pick up the placed original.

The cover sensor 17 detects whether the cover 16 is open or closed. The cover sensor 17 may include, for example, a protrusion that is biased upward and protrudes from a main body of the image forming apparatus 100. When the cover 16 is closed, the protrusion of the cover sensor 17 is pushed downward by the cover 16. On the other hand, when the cover 16 is open, the protrusion of the cover sensor 17 protrudes from the main body of the image forming apparatus 100. The cover sensor 17 is able to detect a state of the cover 16 by detecting that the protrusion is pushed downward. A mounting method of the cover sensor 17 is not limited to the mounting described above.

Figure 3:
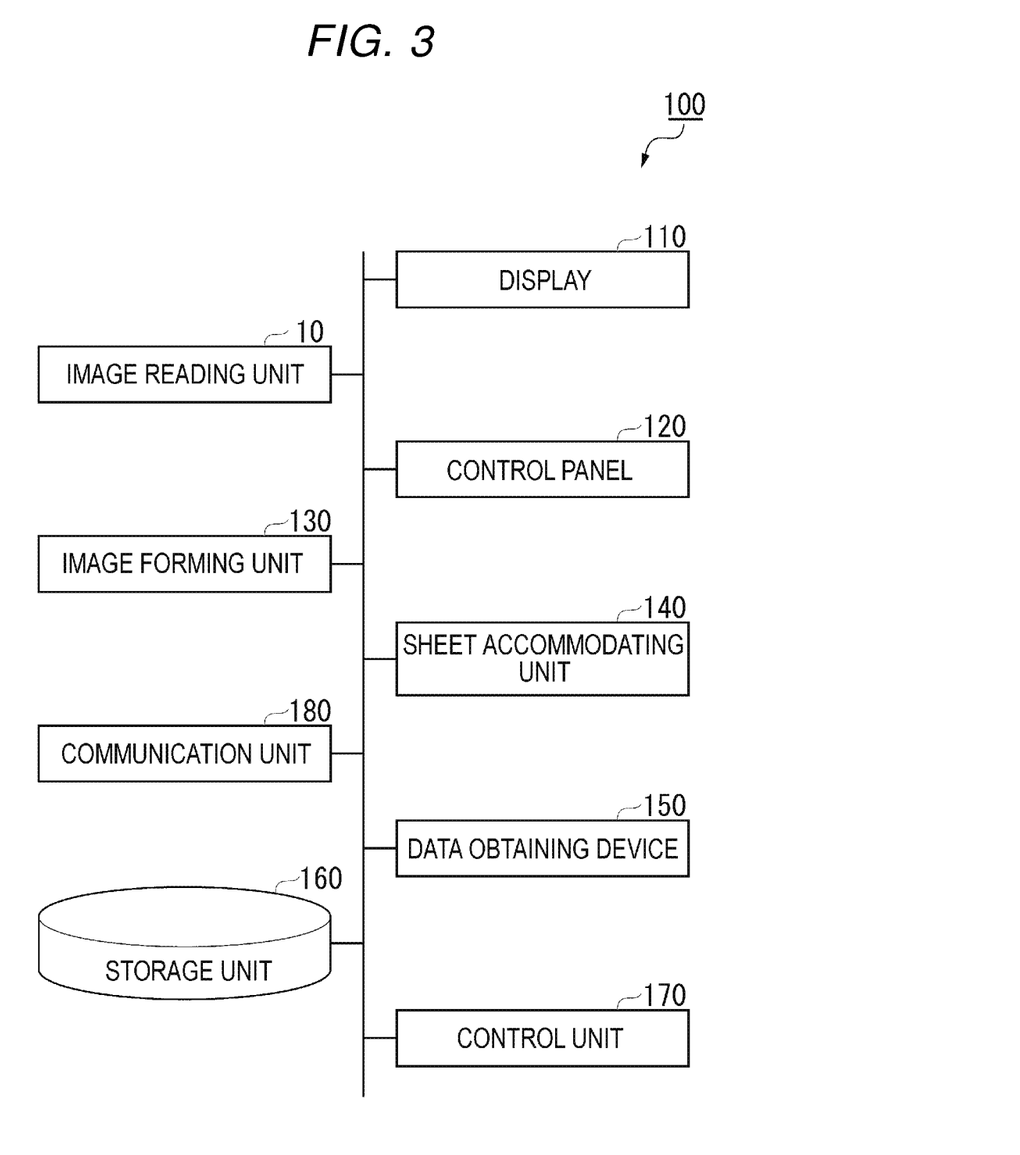
FIG. 3 is a hardware block diagram of an image forming apparatus.

FIG. 3 is a hardware block diagram of the image forming apparatus 100 according to an embodiment. The image forming apparatus 100 includes the image reading unit 10, the display 110, the control panel 120, the image forming unit 130, the sheet accommodating unit 140, the data obtaining device 150, a storage unit 160, a control unit 170, and a communication unit 180. Among such hardware, since the image reading unit 10, the display 110, the control panel 120, the image forming unit 130, the sheet accommodating unit 140, and the data obtaining device 150 are already described, descriptions thereof are omitted.

The storage unit 160 is configured by using a storage device, such as a magnetic hard disk drive, a semiconductor storage device, or the like. The storage unit 160 may be an example of a data storage device. The storage unit 160 stores data required when the image forming apparatus 100 operates. The storage unit 160 may temporarily store image data formed in the image forming apparatus 100. The storage unit 160 may store image data generated by the image reading unit 10.

The control unit 170 is configured by using memory and a processor such as a central processing unit (CPU) or the like. The control unit 170 reads and executes a program pre-stored in the storage unit 160. The control unit 170 controls operations of each device included in the image forming apparatus 100.

The communication unit 180 is configured by using a communication device. The communication unit 180 may be an example of a network interface. The communication unit 180 communicates with another communication device through a network 500 via a predetermined protocol. For example, the communication unit 180 may communicate with the setup server 400 or communicate with the user medium 300.

Figure 4:
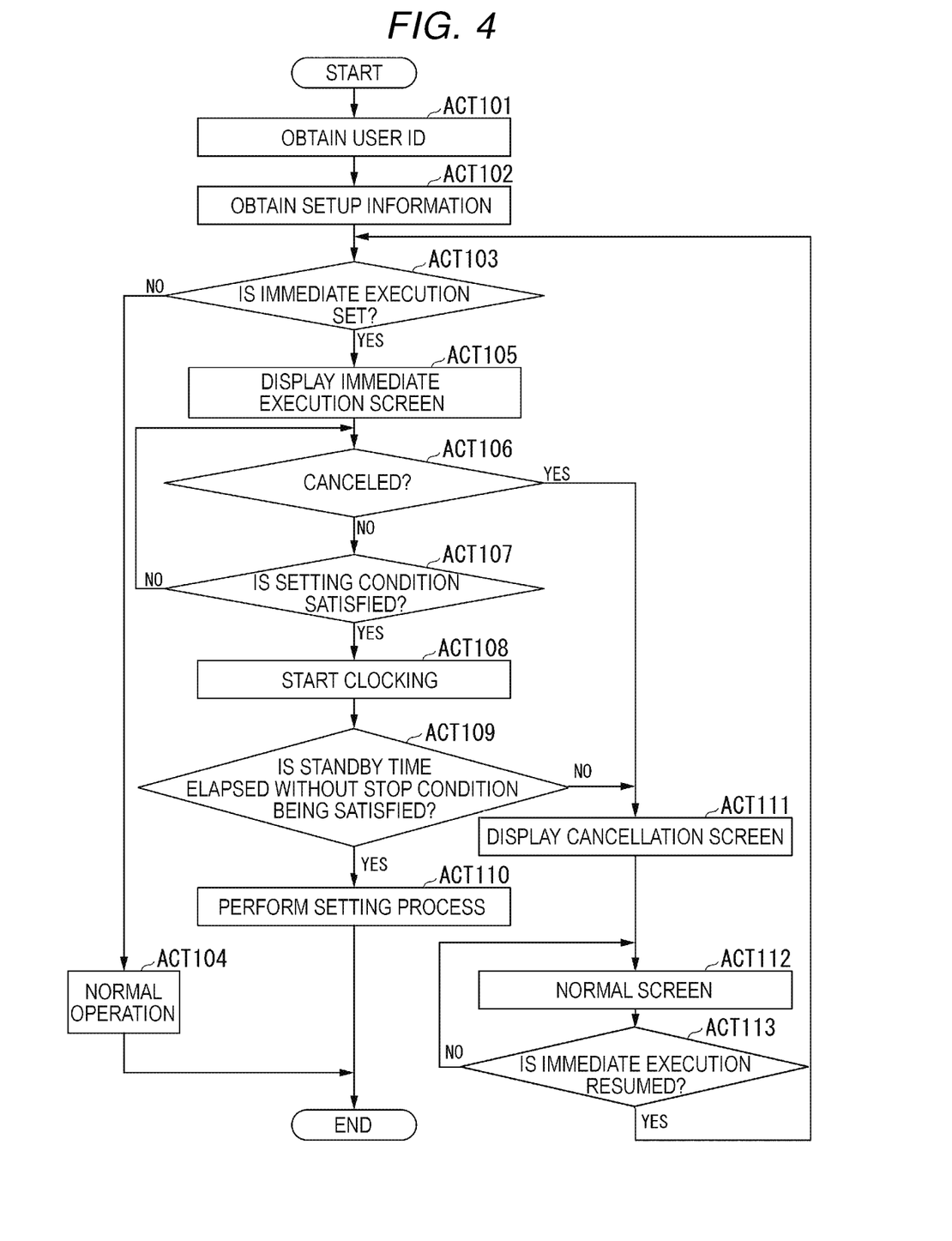
FIG. 4 is a flowchart showing a specific example of operations of a control unit.

FIG. 4 is a flowchart showing a specific example of operations of the control unit 170. Upon obtaining the user ID, the data obtaining device 150 outputs the obtained user ID to the control unit 170. Upon obtaining the user ID from the data obtaining device 150 (ACT 101), the control unit 170 obtains setup information corresponding to the user ID (ACT 102).

For example, when the storage unit 160 stores the user ID and the setup information in association with each other, the control unit 170 may obtain the setup information from the storage unit 160. For example, when the setup server 400 stores the user ID and the setup information in association with each other, the control unit 170 may obtain the setup information from the setup server 400. In particular, the control unit 170 transmits a setup information request including the user ID to the setup server 400. The setup server 400 stores the user ID and the setup information in association with each other. Upon receiving the setup information request, the setup server 400 reads the setup information corresponding to the user ID included in the received setup information request. The setup server 400 generates a setup information response including the read setup information. Then, the setup server 400 transmits the generated setup information response to the image forming apparatus 100 that is a request source.

The control unit 170 determines whether or not immediate execution is set in the obtained setup information (ACT 103). The immediate execution is to execute a process according to a setup in response to the sheet being placed at a predetermined location without a user's operation on a user interface, such as a touch panel or the like. For example, faxing to a predetermined phone number may be set as the immediate execution.

When the immediate execution is not set (ACT 103: NO), the control unit 170 performs a normal operation (ACT 104). The normal operation is not the immediate execution but is a process performed according to the user's operation. Thus, in ACT 104, the control unit 170 controls the image forming apparatus 100 in response to the user's operation. On the other hand, when the immediate execution is set (ACT 103: YES), the control unit 170 displays an immediate execution screen on the display 110 (ACT 105).

Then, the control unit 170 determines whether or not the immediate execution is canceled (ACT 106). The immediate execution is canceled by, for example, the user performing an operation indicating canceling of the immediate execution. For example, the canceling may be performed when a cancel button displayed on the display 110 is operated. For example, the canceling may be performed when the user touches the touch panel. For example, the canceling may be performed when the user operates the control panel 120.

When the immediate execution is canceled (ACT 106: YES), the control unit 170 displays a cancellation screen on the display 110 (ACT 111). Then, the control unit 170 performs the normal operation until the immediate execution is resumed (ACT 112, ACT 113: NO).

On the other hand, when the immediate execution is not canceled (ACT 106: NO), the control unit 170 determines whether or not a setting condition is satisfied (ACT 107). The setting condition indicates a condition that the image reading unit 10 is able to start a reading process as the sheet to be read is placed at a predetermined location. The setting condition may be, for example, detecting of the sheet by the first sensor 11 or the second sensor 12. The setting condition may be, for example, placing of the sheet on the document table 14 and detecting of the cover 16 being closed by the document table sensor and the cover sensor 17.

When the setting condition is not satisfied (ACT 107: NO), the process returns to ACT 106. On the other hand, when the setting condition is satisfied (ACT 107: YES), the control unit 170 starts clocking (ACT 108).

When a standby time is elapsed without a stop condition being satisfied after the clocking started (ACT 109: YES), the control unit 170 performs a preset process corresponding to the user ID (ACT 110). The stop condition indicates a condition for stopping performing of the immediate execution. The stop condition may be, for example, that the user performs an operation indicating stopping of the performing of the immediate execution. The stop condition may be, for example, that the user performs an operation indicating cancellation. The stop condition may be, for example, that the setting condition is not satisfied as the user moves the sheet or the cover 16. The stop condition may be, for example, that the user operates the control panel 120.

The preset process is a predetermined process pre-registered by the user. The user may register, for example, a process type and an operation condition for the preset process. The process type indicates a type of process to be performed by the image forming apparatus 100. Specific examples of the process type include coping, faxing, and scanning. The operation condition is information indicating a condition of an operation when a process indicated by the process type is performed. When the process type is coping, specific examples of the operation condition include a scaling factor, the number of copies, integration multiple pages into one page, double-sided copying, a post-processing type, and the like. When the process type is faxing, specific examples of the operation condition include transmission destination phone numbers and the like. When the process type is scanning, specific examples of the operation condition include a scaling factor, data output destination information, a file format, and the like. When the preset process is performed, the control unit 170 performs a process of type determined by the process type under a condition determined by the operation condition.

When the stop condition is satisfied between when the clocking is started and when the standby time is elapsed (ACT 109: NO), the control unit 170 displays the cancellation screen on the display 110 (ACT 111). Then, the control unit 170 performs the normal operation until the immediate execution is resumed (ACT 112, ACT 113: NO).

The immediate execution is resumed when the user instructs the immediate execution to be resumed. For example, the immediate execution is resumed when the user operates a button indicating resumption of the immediate execution on the cancellation screen displayed on the display 110.

Figure 5:
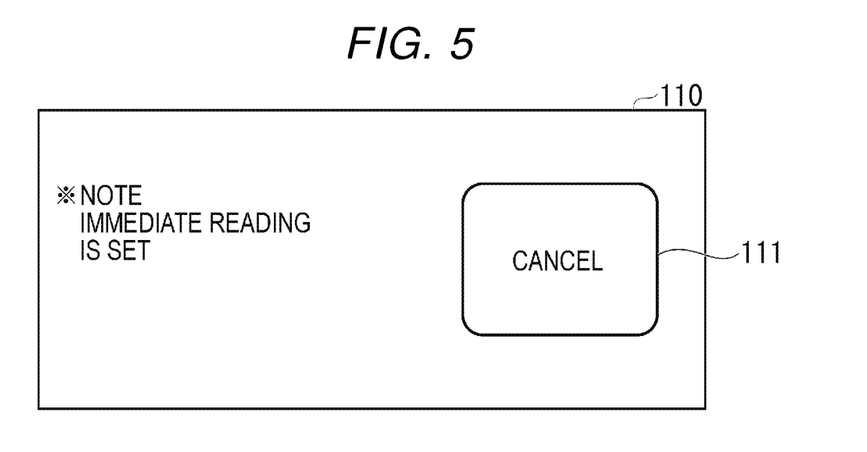
FIG. 5 is a diagram showing a first specific example of an immediate execution screen.

FIG. 5 is a diagram showing a first specific example of an immediate execution screen. The immediate execution screen is displayed on the display 110 by the control unit 170 when the image forming apparatus 100 operates based on the setup information in which the immediate execution is set. The immediate execution screen may include, for example, a cancel button 111. When the user operates the cancel button 111, the control unit 170 determines that cancellation is performed (for example, ACT 106). A text message or image for notifying the user that the immediate execution is to be performed may be displayed on the immediate execution screen. In the example of FIG. 5, a character string of "immediate reading is set" is displayed.

Figure 6:
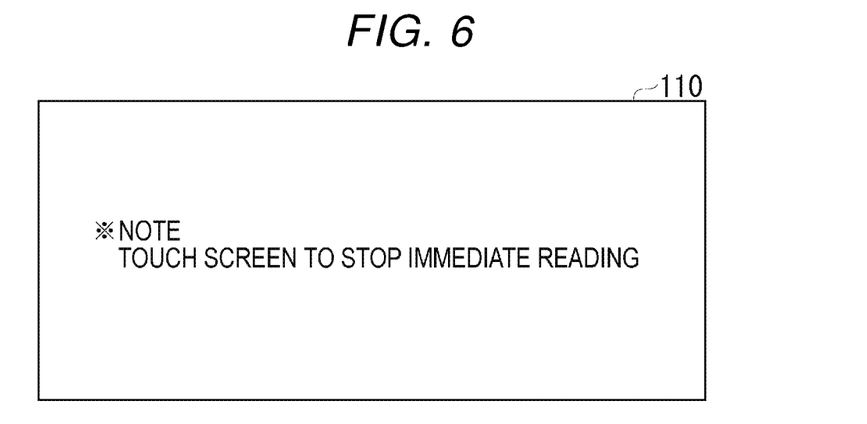
FIG. 6 is a diagram showing a second specific example of an immediate execution screen.

FIG. 6 is a diagram showing a second specific example of an immediate execution screen. In the specific example of FIG. 6, the cancel button 111 is not included in the immediate execution screen. In the specific example of FIG. 6, the control unit 170 determines that cancellation is performed when the user touches anywhere on the display 110 (for example, ACT 106). In the example of FIG. 6, a character string of "touch screen to stop immediate reading" is displayed.

Figure 7:
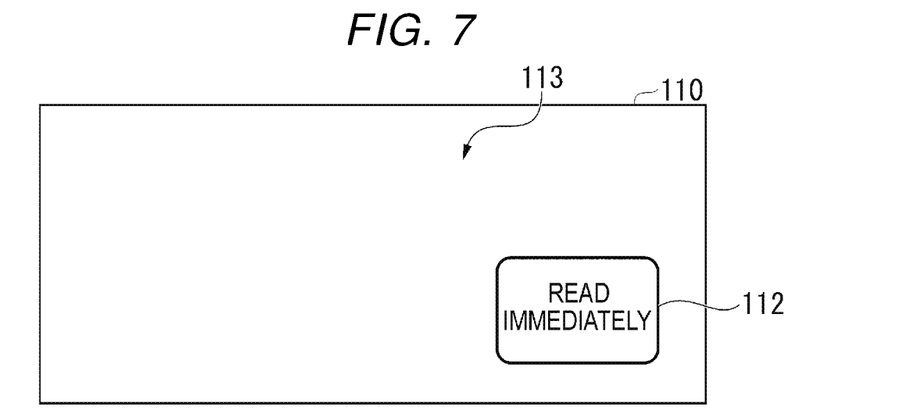
FIG. 7 is a diagram showing a specific example of a cancellation screen.

FIG. 7 is a diagram showing a specific example of a cancellation screen. The cancellation screen is a screen displayed on the display 110 when the immediate execution is canceled after the immediate execution is set or when the stop condition is satisfied. The cancellation screen is displayed on the display 110 by the control unit 170 in ACT 111 of the flowchart of FIG. 4. In the cancellation screen, for example, a resume button 112 may be included. When the user operates the resume button 112, the control unit 170 determines that the immediate execution is resumed (for example, ACT 113: YES). A normal screen region 113 is included in the cancellation screen. A screen displayed when the image forming apparatus 100 normally operates is displayed in the normal screen region 113.

The image forming apparatus 100 configured as such may achieve higher job efficiency regarding a job using the image forming apparatus 100, specifically as follows. In the image forming apparatus 100, when the immediate execution is set, the preset process is automatically performed even if the user does not perform any further operation, when a predetermined standby time is elapsed after the setting condition (for example, setting of an original) is satisfied. Accordingly, the user does not need to further operate the image forming apparatus 100 after the original is set and the like such that the setting condition is satisfied. Thus, for example, the user may move onto another job. As such, higher job efficiency may be achieved by performing the immediate execution.

Further, in the image forming apparatus 100, when the immediate execution is set, the process is not started immediately even if the setting condition is satisfied, but is started after the standby time is elapsed. Thus, even if the user does not want the immediate process, the immediate execution may be stopped by performing a stop operation after setting the original.

In addition, in the image forming apparatus 100, it is possible to easily resume the immediate execution by performing a predetermined operation on the cancellation screen even after stopping the immediate execution once. Thus, even if the immediate execution is stopped due to circumstances, it is possible to increase the job efficiency again thereafter.

Modification

In the above embodiment, it is assumed that the immediate execution is pre-set in association with the user ID. However, the immediate execution may be set manually by the user. For example, a button for instructing performing of the immediate execution may be provided on the display 110 or the control panel 120. When the immediate execution is instructed to be performed after a specific process is set, the control unit 170 causes the display 110 to display the immediate execution screen by planning to perform the immediate execution. Then, when the setting condition is satisfied, the control unit 170 starts clocking and performs the set process (the specific process) via the immediate execution after the standby time is elapsed without the stop condition being satisfied. Here, the specific process denotes a process, for example, coping, faxing, scanning, or the like. At this time, the operation condition may be further set. In particular, when the immediate execution is instructed to be performed after the process type and the operation condition are set, the immediate execution may be performed with respect to a process of the set process type and operation condition.

The process type or the operation condition may be changed by the user after canceling of ACT 106 or the stopping of ACT 109. Such a change is performed by, for example, operating the display 110 or the control panel 120. Then, when the immediate execution is resumed, the control unit 170 may perform the preset process according to the process type or the operation condition after the change, in ACT 110.

Further, in the above embodiment, the button or the character string for canceling the immediate execution is displayed on the immediate execution screen as shown in FIGS. 5 and 6, but the embodiment is not limited thereto. For example, a button for selecting which preset process among coping, faxing, and scanning is to be performed may be displayed. Accordingly, the user may select and perform the preset process to be performed during the predetermined standby time after the setting condition (for example, placement of the original) is satisfied. In addition, when the user tries to copy via the immediate execution, it is possible to prevent faxing from being performed and image data from being transmitted to an unintended facsimile machine.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
   a sensor configured to detect an original;
   a scanner configured to scan the original and generate image data of the scanned original;
   an image forming unit configured to form an image on a sheet based on the image data; and
   a controller configured to control the scanner to start scanning if the sensor still detects the original after a standby time being passed since the sensor detects the original.

2. The image forming apparatus according to claim 1, wherein the controller does not control the scanner to start the scanning if the sensor stops detecting the original before the standby time is passed.

3. The image forming apparatus according to claim 1, wherein the controller does not control the scanner to start the scanning if the controller detects a predetermined user operation before the standby time is passed.

4. The image forming apparatus according to claim 3, further comprising:
a control panel configured to receive the predetermined user operation.

5. The image forming apparatus according to claim 1, further comprising:
a tray, wherein the sensor is configured to detect the original placed on the tray.

6. The image forming apparatus according to claim 1, further comprising:
a document table; and
a second scanner configured to scan the original through the document table, wherein the scanner is configured to scan the original conveyed from the tray.

7. The image forming apparatus according to claim 1, further comprising:
a document table, wherein the scanner is configured to scan the original through the document table.

8. An image forming apparatus comprising:
a document table;
a scanner configured to detect an original on the document table, scan the original through the document table, and generate image data of the scanned original;
an image forming unit configured to form an image on a sheet based on the image data; and
a controller configured to control the scanner to start scanning after a standby time being passed since the scanner detects the original.

9. The image forming apparatus according to claim 8, wherein the controller does not control the scanner to start the scanning if the scanner stops detecting the original before the standby time is passed.

10. The image forming apparatus according to claim 8, wherein the controller does not control the scanner to start the scanning if the controller detects a predetermined user operation before the standby time is passed.

11. The image forming apparatus according to claim 10, further comprising:
a control panel configured to receive the predetermined user operation.

12. An image forming apparatus comprising:
a document table;
a cover configured to cover the document table; and
a cover sensor configured to detect the cover at a position to cover the document table;
a scanner configured to detect an original on the document table, scan the original through the document table, and generate image data of the scanned original;
an image forming unit configured to form an image on a sheet based on the image data; and
a controller configured to control the scanner to start scanning after a standby time being passed since at least one of the cover sensor detecting the cover at the position and the scanner detecting the original.

13. The image forming apparatus according to claim 12, wherein the controller is configured to control the scanner to start the scanning after the standby time being passed since the cover sensor detecting the cover at the position.

14. The image forming apparatus according to claim 13, wherein the controller does not control the scanner to start the scanning if the cover sensor stops detecting the cover at the position before the standby time is passed.

15. The image forming apparatus according to claim 12, wherein the controller is configured to control the scanner to start the scanning after the standby time being passed since both the cover sensor detecting the cover at the position and the scanner detecting the original.

16. The image forming apparatus according to claim 15, wherein the controller does not control the scanner to start the scanning if the cover sensor stops detecting the cover at the position or the scanner stops detecting the original before the standby time is passed.

17. The image forming apparatus according to claim 12, wherein the controller does not control the scanner to start the scanning if the controller detects a predetermined user operation before the standby time is passed.

18. The image forming apparatus according to claim 17, further comprising:
a control panel configured to receive the predetermined user operation.

* * * * *